(12) United States Patent
Itou et al.

(10) Patent No.: US 12,182,681 B2
(45) Date of Patent: Dec. 31, 2024

(54) INFORMATION PROCESSING DEVICE, INFORMATION PROCESSING METHOD, AND STORAGE MEDIUM

(71) Applicants: Kabushiki Kaisha Toshiba, Tokyo (JP); Toshiba Digital Solutions Corporation, Kawasaki (JP)

(72) Inventors: Hidemasa Itou, Inagi (JP); Yukio Kamatani, Kawasaki (JP); Katsuyuki Hanai, Fuchu (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 935 days.

(21) Appl. No.: 17/098,508

(22) Filed: Nov. 16, 2020

(65) Prior Publication Data
US 2021/0064978 A1     Mar. 4, 2021

Related U.S. Application Data

(63) Continuation of application No. PCT/JP2019/019077, filed on May 14, 2019.

(30) Foreign Application Priority Data

May 23, 2018    (JP) ................................. 2018-099175

(51) Int. Cl.
     *G06N 20/00*      (2019.01)
     *G06F 17/16*      (2006.01)
     (Continued)

(52) U.S. Cl.
CPC ............... *G06N 3/04* (2013.01); *G06F 17/16* (2013.01); *G06F 18/29* (2023.01); *G06N 3/063* (2013.01); *G06N 3/08* (2013.01)

(58) Field of Classification Search
CPC ............ G06N 3/04; G06N 3/063; G06N 3/08; G06N 3/048; G06N 5/022; G06F 17/16; G06F 18/29; G06F 18/24133
See application file for complete search history.

(56) References Cited

U.S. PATENT DOCUMENTS

2017/0061276 A1    3/2017   Riley et al.
2018/0167289 A1*   6/2018   Beyer ................... H04L 43/045
(Continued)

FOREIGN PATENT DOCUMENTS

JP           05-061984 A      3/1993

OTHER PUBLICATIONS

Xiang, Biao, et al. "Feature propagation on graph: A new perspective to graph representation learning." arXiv preprint arXiv: 1804.06111 (2018) (Year: 2018).*

(Continued)

*Primary Examiner* — Andrew T McIntosh
(74) *Attorney, Agent, or Firm* — Oblon, McClelland, Maier & Neustadt, L.L.P.

(57) ABSTRACT

An information processing device of embodiments includes a data acquirer and a network processor. The data acquirer is configured to acquire graph structure data that includes a plurality of real nodes and one or more real edges connecting two of the plurality of real nodes. The network processor is configured to execute processing of propagating a feature amount of a $k-1^{th}$ layer of each of a plurality of assumed nodes that include the plurality of real nodes and the one or more real edges at least to a feature amount of a $k^{th}$ layer of another assumed node in a connection relationship with each of the assumed nodes in a neural network on the basis of the graph structure data acquired by the data acquirer. k is a natural number equal to or more than 1.

5 Claims, 10 Drawing Sheets

(51) Int. Cl.
*G06F 18/20* (2023.01)
*G06N 3/04* (2023.01)
*G06N 3/063* (2023.01)
*G06N 3/08* (2023.01)

(56) References Cited

U.S. PATENT DOCUMENTS

2018/0307999 A1* 10/2018 Katsuki ............... G06N 7/01
2018/0314521 A1* 11/2018 Chen ................ G06F 9/3836
2020/0090278 A1* 3/2020 Christensen .......... G06Q 40/04
2021/0081717 A1* 3/2021 Creed ................. G06N 5/022

OTHER PUBLICATIONS

Neumann, Marion, et al. "Propagation kernels: efficient graph kernels from propagated information." Machine learning 102 (2016): 209-245 (Year: 2016).*
Grover, Aditya, and Jure Leskovec. "node2vec: Scalable feature learning for networks." Proceedings of the 22nd ACM SIGKDD international conference on Knowledge discovery and data mining. 2016 (Year: 2016).*
Velickovic et al., "Graph Attention Networks", Published as a conference paper at ICLR 2018, Feb. 4, 2018, 12 pages.
Ito et al., "A Malicious Web Site Detection Technique using Link Structure", Proceedings of Computer Security Symposium 2016, vol. 2016, No. 2, 2016, 12 pages (with English Machine Translation).

* cited by examiner

CHANGING TO ASSUMED NODE

INFORMATION PROCESSING DEVICE, INFORMATION PROCESSING METHOD, AND STORAGE MEDIUM

CROSS-REFERENCE TO RELATED APPLICATION

This application is based upon and claims the benefit of priority from Japanese Patent Application No. 2018-099175, filed May 23, 2018 and PCT/JP2019/019077 filed May 14, 2019; the entire contents of which are incorporated herein by reference.

FIELD

Embodiments of the present invention relate to an information processing device, an information processing method, and a storage medium.

BACKGROUND

In recent years, attempts to utilize artificial intelligence in industrial fields have been in progress. Artificial intelligence technology that has been considered for use mainly includes deep learning and its related technologies and has an application range expanding to image recognition, failure analysis, and property prediction.

In particular, research and practical use utilizing a convolutional neural network (CNN) have been actively in progress in image recognition. In a CNN, each pixel point of an image is subjected to filtering processing (convolution processing, pooling processing) using neighboring pixel information and is input to a full connection neural network, and thereby it is possible to achieve calculation efficiency and accuracy improvement. Convolution or pooling as filtering processing is considered to reflect a structure of an actual visual system in which processing in a receptive field of an actual visual cortex is local processing which targets only signals of neighboring visual cells onto a structure of a neural network. In this filtering processing, the same processing is performed in parallel in a distributed manner in an entire visual cortex. Then, in a neural network in which the visual system is reflected, a connection structure of each pixel has a local connection graph structure at least immediately after the input. In relation to this, research for a neural network in which a graph structure is reflected has been in progress to apply data of a graph structure to artificial intelligence.

However, there are cases where conventional neural network technology that reflects a graph structure cannot cope with needs such as large scale, diversity, and variability.

DETAILED DESCRIPTION

An information processing device of embodiments includes a data acquirer and a network processor. The data acquirer is configured to acquire graph structure data that includes a plurality of real nodes and one or more real edges connecting two of the plurality of real nodes. The network processor is configured to execute processing of propagating a feature amount of a $k-1^{th}$ layer of each of a plurality of assumed nodes that include the plurality of real nodes and the one or more real edges at least to a feature amount of a $k^{th}$ layer of another assumed node in a connection relationship with each of the assumed nodes in a neural network on the basis of the graph structure data acquired by the data acquirer. k is a natural number equal to or more than 1.

Hereinafter, an information processing device, an information processing method, and a program according to embodiments will be described with reference to the drawings.

Figure 1:
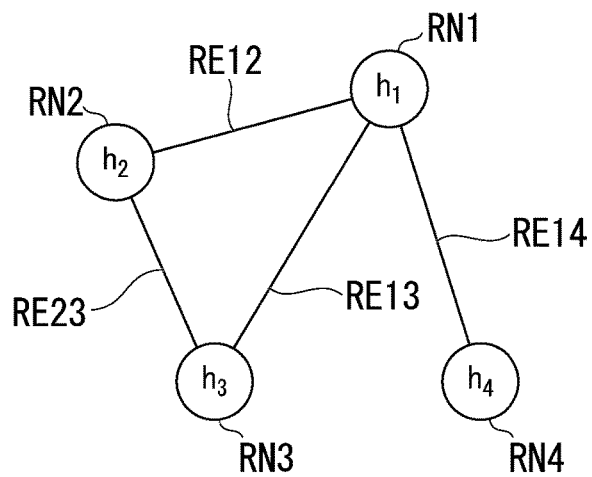
FIG. 1 is a diagram which shows how a neural network is generated based on graph structure data according to a conventional way of consideration.
Figure 1:
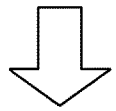
Figure 1:
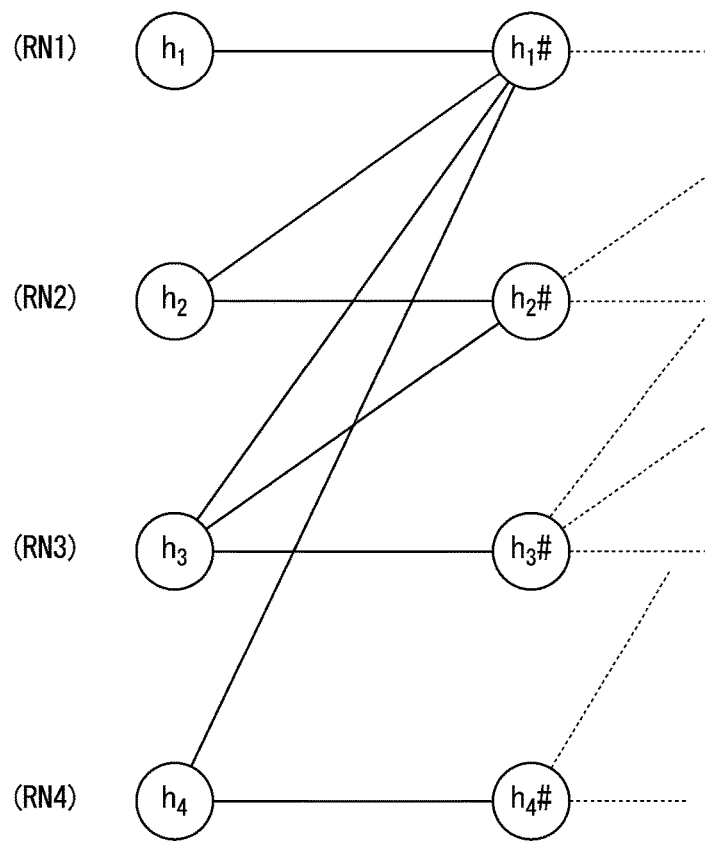

First, a principle of a neural network created by the information processing device will be described. FIG. 1 is a diagram which shows how a neural network is generated based on graph structure data according to a conventional way of consideration.

An upper diagram of FIG. 1 schematically shows graph structure data. In the configuration shown, real nodes RN1 to RN4 are present. "Real node" is a concept distinguished from "assumed node" to be described below, and refers to a node in data (processing target data, original data) of a graph structure acquired by the information processing device. The real node RN1 has a feature amount h1, the real node RN2 has a feature amount h2, the real node RN3 has a feature amount h3, and the real node RN4 has a feature amount h4. The feature amounts are, for example, vectors, but scalars and vectors are not distinguished in notation in the present specification and the drawings.

In the upper diagram of FIG. 1, the real node RN1 and the real node RN2 are connected by a real edge RE12, the real node RN1 and the real node RN3 are connected by a real edge RE13, the real node RN1 and the real node RN4 are connected by a real edge RE14, and the real node RN2 and the real node RN3 are connected by a real edge RE23. "Real edge" is a concept distinguished from "assumed edge," and refers to an edge in the graph structure data acquired by the information processing device. The expression "being connected" herein refers to a relationship in which mutual feature amounts influence the feature amounts of both sides in a next state. This definition assumes an undirected graph as a premise, but when a directed graph is dealt with, "being connected" refers to a relationship in which one feature amount influences the other feature amount in the next state.

A lower diagram of FIG. 1 shows an example of a neural network generated on the basis of the graph structure data shown in the upper diagram of FIG. 1. Each of h1#, h2#, h3#, and h4# is a feature amount in a first intermediate layer of the feature amount of each of the real nodes RN1, RN2, RN3, and RN4. As shown in the figure, the real edge RE in the upper diagram of FIG. 1 has a connection structure of a neural network as it is. The feature amount h1# is represented by Equation (1). In the equation, α1,1 to α1,4 are coefficients indicating a degree of propagation. In this manner, the feature amount of a $k^{th}$ layer of a real node RN is obtained by multiplying the feature amounts of a $k-1^{th}$ layer of another real node RN in a connection relationship thereto and the real node RN itself by a coefficient and a propagation matrix W, respectively, and adding them. The propagation matrix will be described below.

$$h1\# = \alpha1,1*W*h1 + \alpha1,2*W*h2 + \alpha1,3*W*h3 + \alpha1,4*W*h4 \quad (1)$$

First Embodiment

Figure 2:
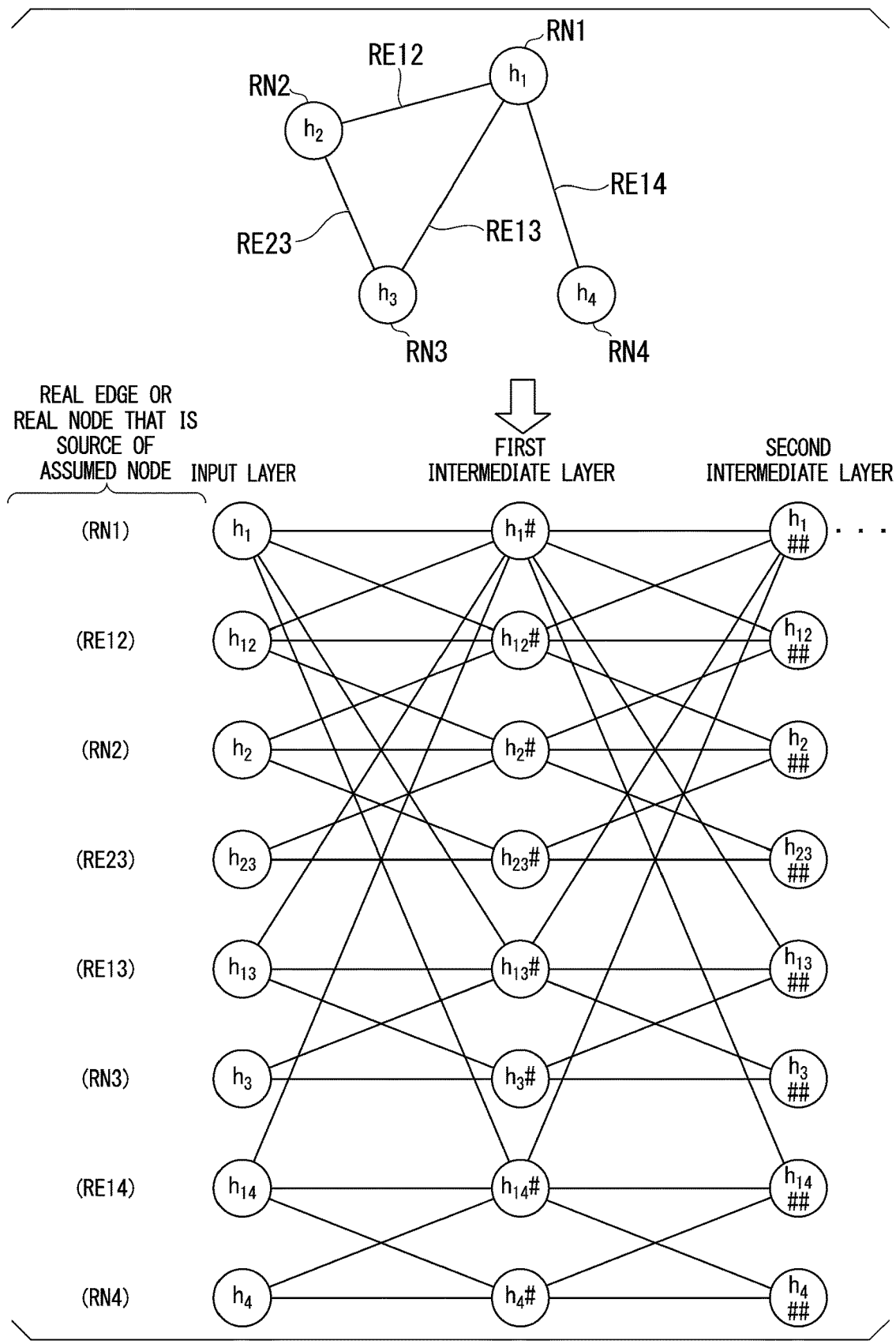
FIG. 2 is a diagram which shows how a neural network is generated based on graph structure data according to a method of a first embodiment.

FIG. 2 is a diagram which shows how a neural network is generated based on graph structure data according to a method of the first embodiment. As shown in the figure, the information processing device of the first embodiment sets an assumed node AN including not only a real node RN but also a real edge RE and generates a neural network in which a feature amount of a $k-1^{th}$ layer of the assumed node AN is propagated to another assumed node AN in a connection relationship thereto and a feature amount of a $k^{th}$ layer of the assumed node AN itself. k is a natural number equal to or more than 1, and a layer of k=0 is, for example, an input layer.

The information processing device determines a feature amount of a first intermediate layer on the basis of, for example, Equation (2). Equation (2) corresponds to a calculation method of a feature amount h1# of a first intermediate layer of an assumed node (RN1). As an example, α1,12 is a coefficient indicating a degree of propagation between the assumed node (RN1) and an assumed node (RE12). A feature amount h1## of a second intermediate layer of the assumed node (RN1) is represented by Equation (3). The feature amounts are sequentially determined by the same rule for a third intermediate layer and subsequent layers.

$$h1\# = \alpha1,1*W*h1 + \alpha1,12*W*h12 + \alpha1,13*W*h13 + \alpha1,14*W*h14 \quad (2)$$

$$h1\#\# = \alpha1,1*W*h1\# + \alpha1,12*W*h12\# + \alpha1,13*W*h13\# + \alpha1,14*W*h14\# \quad (3)$$

Figure 3:
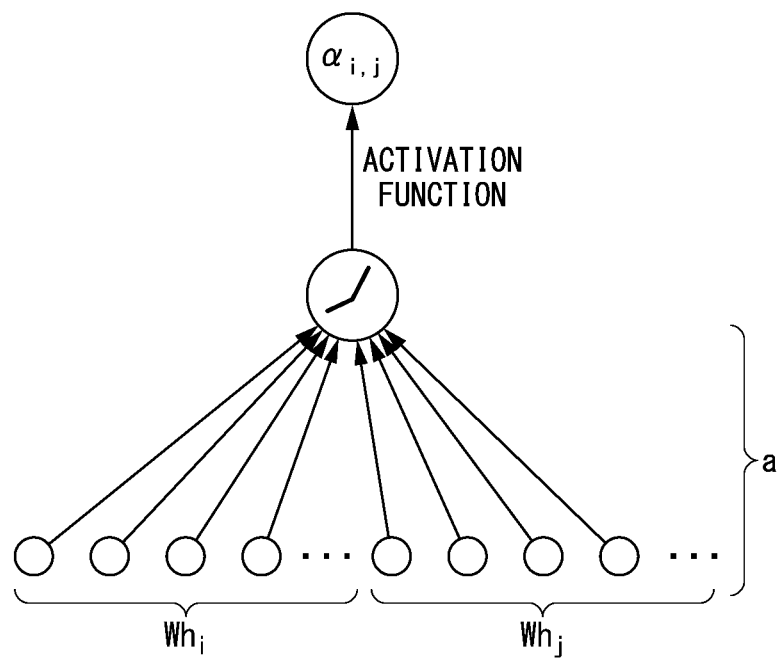
FIG. 3 is a diagram for describing a method in which an information processing device determines a coefficient αi,j.

The information processing device determines a coefficient αi,j by, for example, a rule based on the graph attention network. FIG. 3 is a diagram for describing a method in which the information processing device determines the coefficient αi,j. The information processing device derives the coefficient αi,j by inputting a combined vector (Whi, Whj) of a vector Whi obtained by multiplying a feature amount hi of an assumed node RNi of a propagation source by the propagation matrix W, and a vector Whj obtained by multiplying a feature amount hj of an assumed node RNj of a propagation destination by the propagation matrix W to an individual neural network a (attention), inputting and normalizing vectors of an output layer to an activation function such as a sigmoid function, ReLU, and a softmax function, and adding them. The individual neural network a has parameters and the like requested for an event to be analyzed in advance.

The information processing device determines parameters (W, αi,j) of the neural network to meet a purpose of the neural network while following the rule described above.

The purpose of the neural network is to output a future state when the assumed node AN is set to be in a current state, to output an index for evaluating the current state, or to classify the current state.

Figure 4:
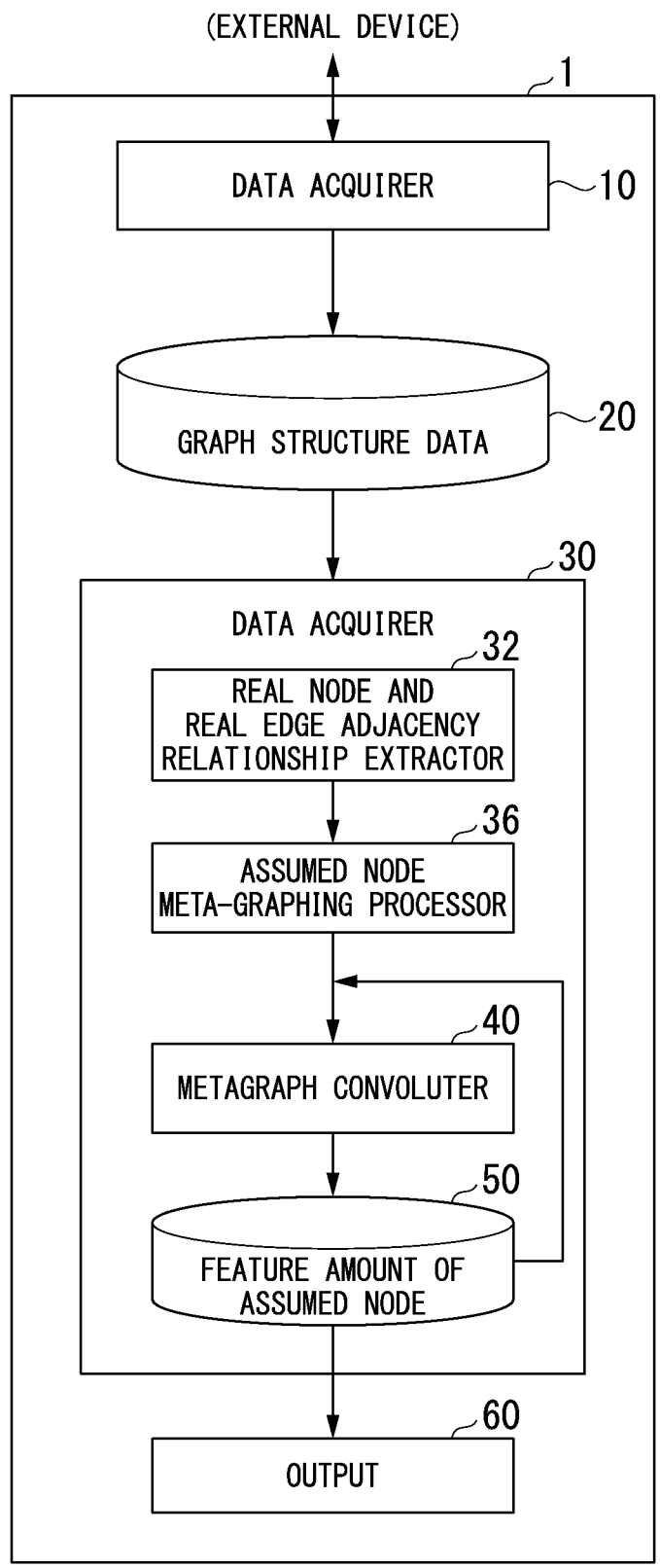
FIG. 4 is a block diagram of the information processing device according to the first embodiment.

FIG. 4 is a block diagram of an information processing device 1 according to the first embodiment. The information processing device 1 includes, for example, a data acquirer 10, a network processor 30, and an output 60. These functional units are realized by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU), or may also be realized by software and hardware in cooperation. The program may be stored in a storage device such as a hard disk drive (HDD) or a flash memory, or may be stored in a detachable storage medium such as a DVD or a CD-ROM and installed by the storage medium being mounted in a drive device.

The data acquirer 10 acquires, for example, graph structure data 20 from an external device and causes a storage to store it. The storage is realized by, for example, a random access memory (RAM), a hard disk drive (HDD), a flash memory, or the like. The graph structure data 20 is, for example, data in which the graph structure as shown in the upper diagrams of FIGS. 1 and 2 is expressed as a record of each of the real node RN and the real edge RE. A feature amount serving as an initial state of each real node RN may be given to the graph structure data 20. The feature amount serving as the initial state of a real node RN may be prepared as a data set different from the graph structure data 20. The data acquirer 10 may acquire (read) the graph structure data 20 stored in the storage in advance, instead of acquiring the graph structure data 20 from an external device, and may also acquire the graph structure data 20 which is input by a user using an input device.

The network processor 30 includes, for example, a real node and real edge adjacency relationship extractor 32, an assumed node meta-graphing processor 36, and a metagraph convoluter 40.

The real node and real edge adjacency relationship extractor 32 refers to the graph structure data 20 and extracts a real node RN and a real edge RE that are in an adjacency relationship (a connection relationship). For example, the real node and real edge adjacency relationship extractor 32 comprehensively extracts a real node RN or a real edge RE in an adjacency relationship (a connection relationship) for each real node RN and real edge RE and causes them to be stored in a storage in an associated form.

The assumed node meta-graphing processor 36 generates a neural network in which states of the assumed node AN are connected in layers such that the real node RN and the real edge RE extracted by the real node and real edge adjacency relationship extractor 32 are connected. At this time, the assumed node meta-graphing processor 36 determines the propagation matrix W and the coefficient αi,j to meet the purpose of the neural network described above while following the rule based on the graph attention network described above.

The metagraph convoluter 40 inputs, for example, the feature amount as an initial value of the real node RN in the assumed node AN to the neural network and derives the state (the feature amount) of the assumed node AN of each layer. The output 60 outputs the feature amount of the assumed node AN to the outside by repeatedly executing this processing.

According to the first embodiment described above, it is possible to cope with a wider range of needs.

Second Embodiment

A second embodiment will now be described. In the second embodiment, the information processing device sets a type for at least one of a real edge and a real node RN that is a source of an assumed node AN (in other words, sets a type for the assumed node AN), and changes a rule when a coefficient is set for each type. More specifically, the information processing device makes the propagation matrix W for determining the coefficient $\alpha_{i,j}$ that defines a feature amount to be propagated from the assumed node AN different depending on the type of the assumed node AN.

Figure 5:
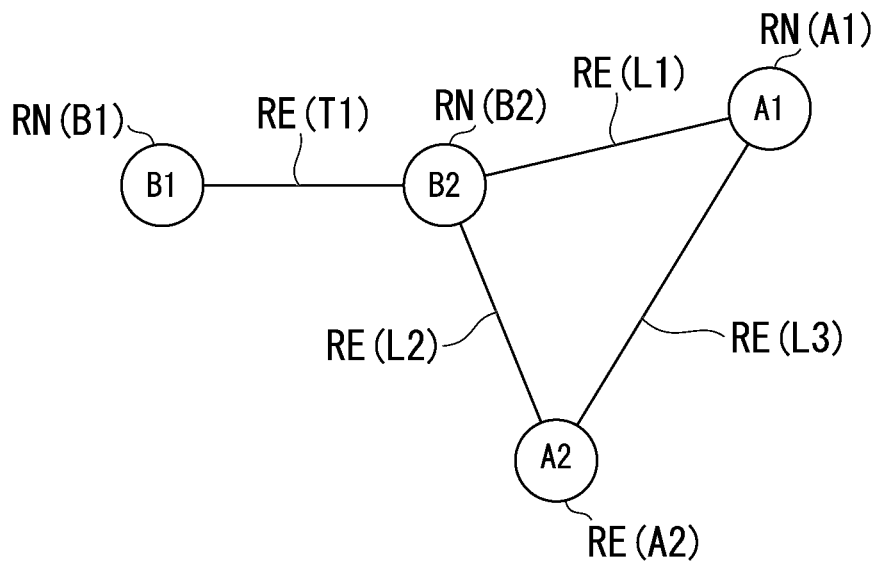
FIG. 5 is a diagram which shows an example of definition of a type of an assumed node AN.
Figure 5:
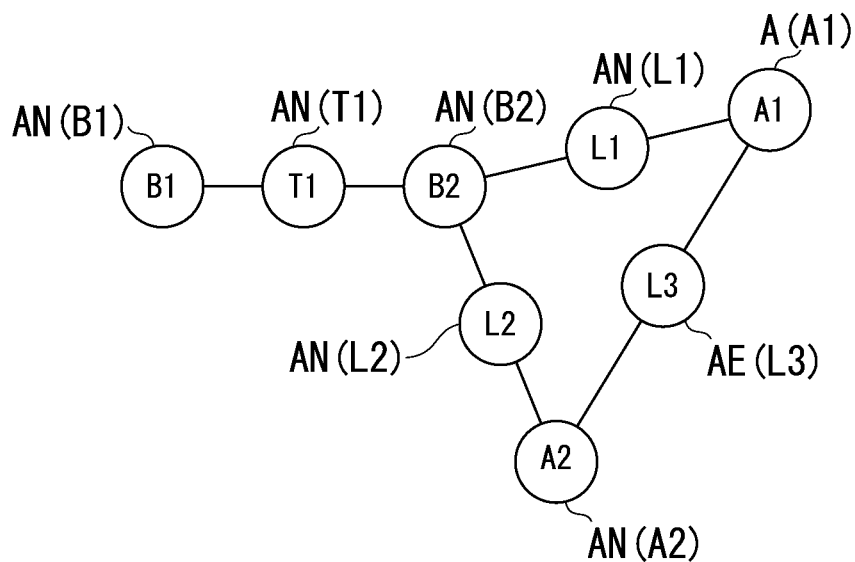

FIG. 5 is a diagram which shows an example of definition of the type of the assumed node AN. In this example, the information processing device of the second embodiment sets two types of A and B for an assumed node that has been the real node RN, and sets two types of L and T for an assumed node that has been the real edge RE. An upper diagram of FIG. 5 shows an example of content of the graph structure data 20, and a lower diagram of FIG. 5 schematically shows how the real node RN and the real edge RE are converted into the assumed node AN.

A real node RN (A) whose type is "A" is connected only to a real edge RE (L) whose type is "L."

A real node RN (B) whose type is "B" is connected to both of the real edge RE (L) whose type is "L" and a real edge RE (T) whose type is "T."

The real edge RE (L) whose type is "L" and the real edge RE (T) whose type is "T" have different propagation characteristics of the feature amounts of real nodes RN connected to themselves.

Numbers following A, B, L, and T are identifiers of a real node RN, a real edge RE, and an assumed node AN. Hereinafter, symbols such as A1, B1, L1, and T2 are identifiers of assumed nodes AN and indicate their feature amounts.

Figure 6:
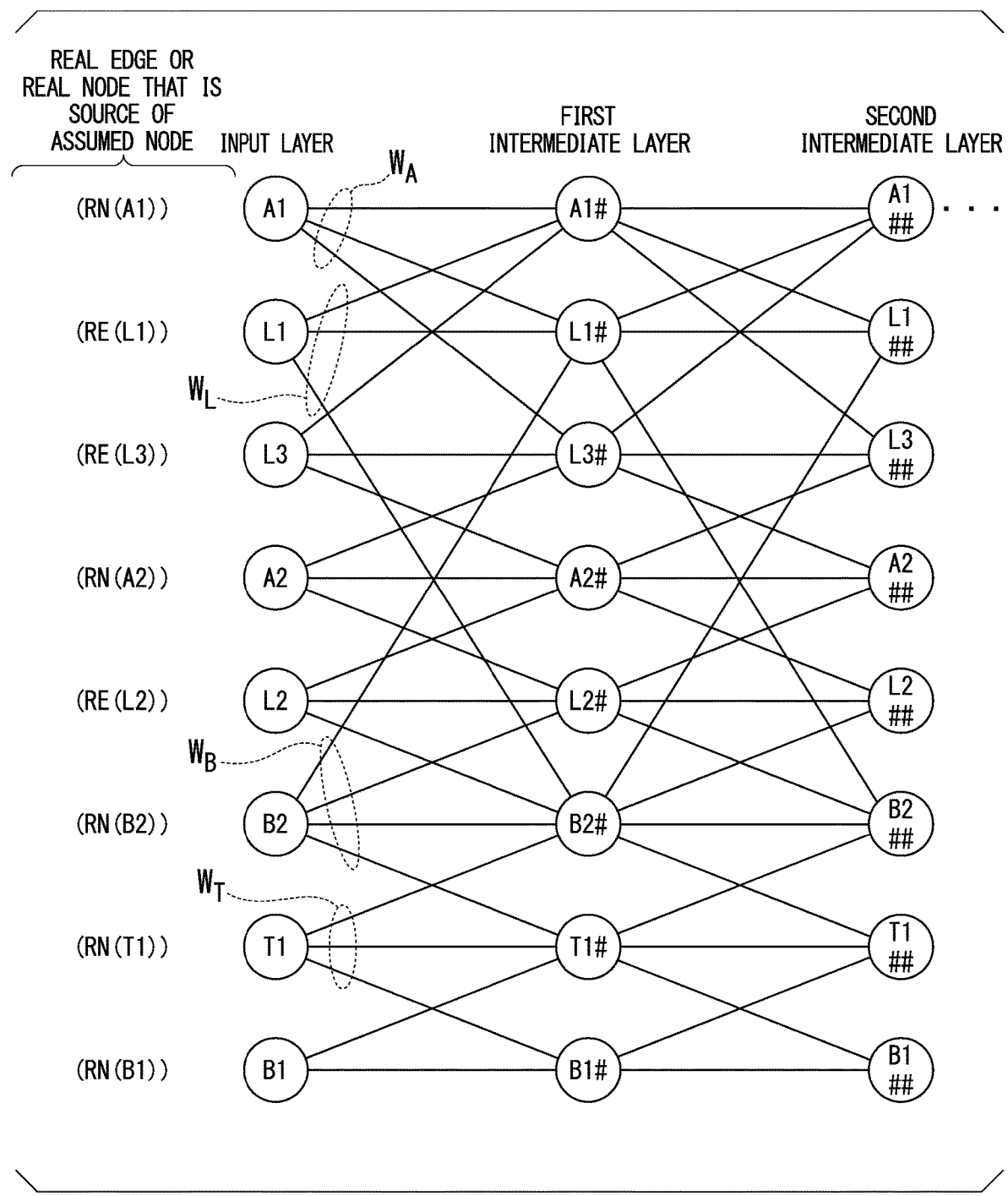
FIG. 6 is a diagram which shows a neural network generated based on graph structure data using a method of a second embodiment.

FIG. 6 is a diagram which shows a neural network generated from the graph structure data 20 according to a method of the second embodiment. A file of generating the neural network is the same as that of the first embodiment, but the information processing device of the second embodiment makes the propagation matrix W for determining the coefficient $\alpha_{i,j}$ that defines a feature amount to be propagated from an assumed node AN different depending on the type of the assumed node AN. Specifically, the information processing device applies a propagation matrix WA to a feature amount to be propagated from an assumed node AN that has been the real node RN (A), applies a propagation matrix WB to a feature amount to be propagated from an assumed node AN that has been the real node RN (B), applies a propagation matrix WL to a feature amount to be propagated from an assumed node AN that has been the real edge RE (L), and applies a propagation matrix WT to a feature amount to be propagated from an assumed node AN that has been the real edge RE (T). Each of the propagation matrixes WA, WB, WL and WT may be made different for each layer.

As a result, it is possible to more accurately follow a difference in characteristics of the real node RN and the real edge RE, and it is possible to accurately predict the state (the feature amount) of the assumed node AN.

Figure 7:
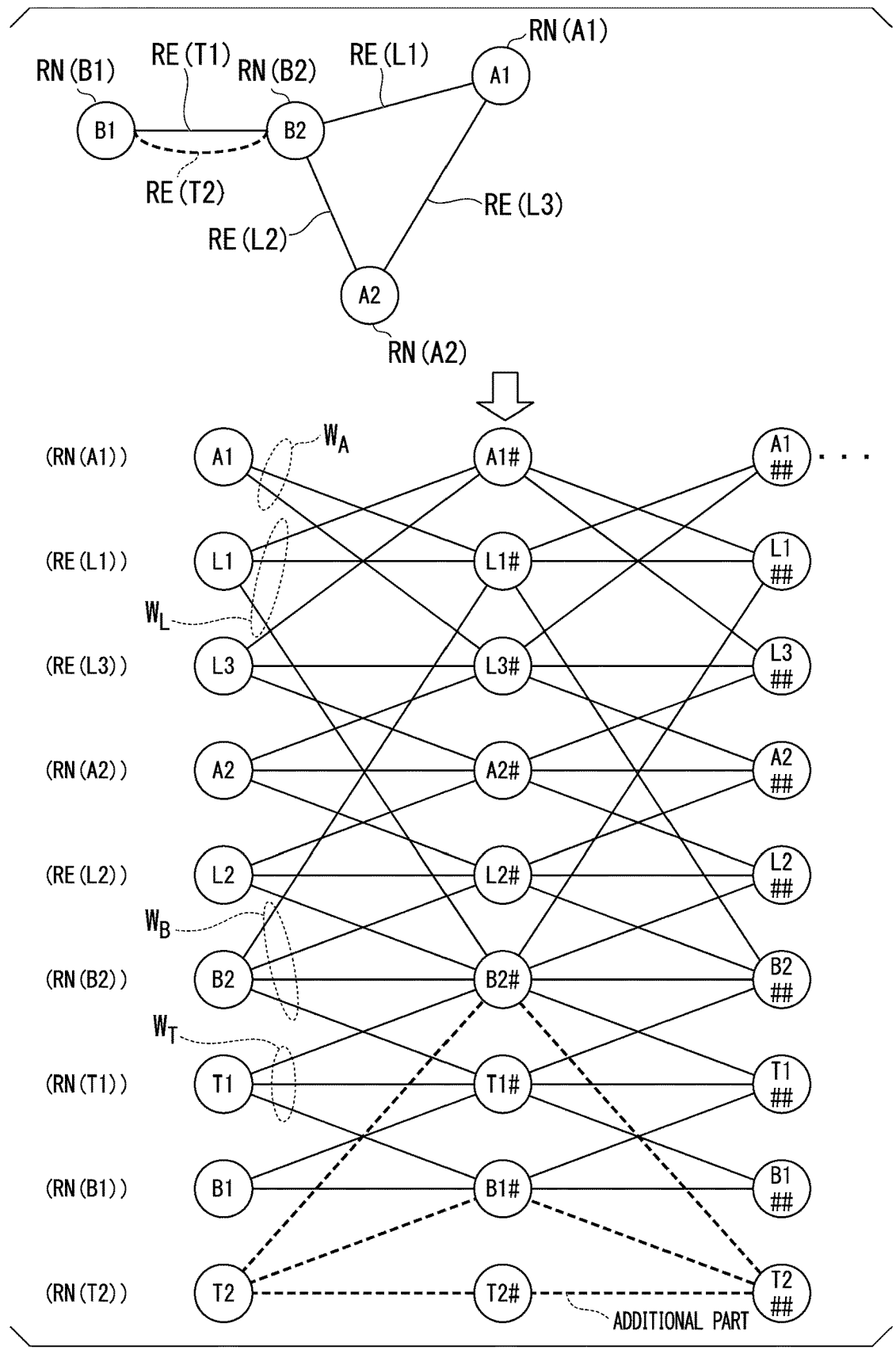
FIG. 7 is a diagram which shows how the neural network is changed according to a change of target data.

According to the information processing device of the first or second embodiment, it is possible to flexibly cope with a change in target data. FIG. 7 is a diagram which shows how the neural network is changed according to a change of target data. If an example of an upper diagram of FIG. 7 is compared with the example of FIG. 5, a real edge RE (T2) that connects a real node RN (B1) and a real node RN (B2) is added. In this case, as shown in a lower diagram of FIG. 7, an assumed node AN (T2) is added in the neural network, and the assumed node AN (T2) and an assumed edge AE that connects assumed nodes AN (B1), AN (B2), and the assumed node AN (T2) itself need to be added. Therefore, it is possible to flexibly cope with a change in target data.

Figure 8:
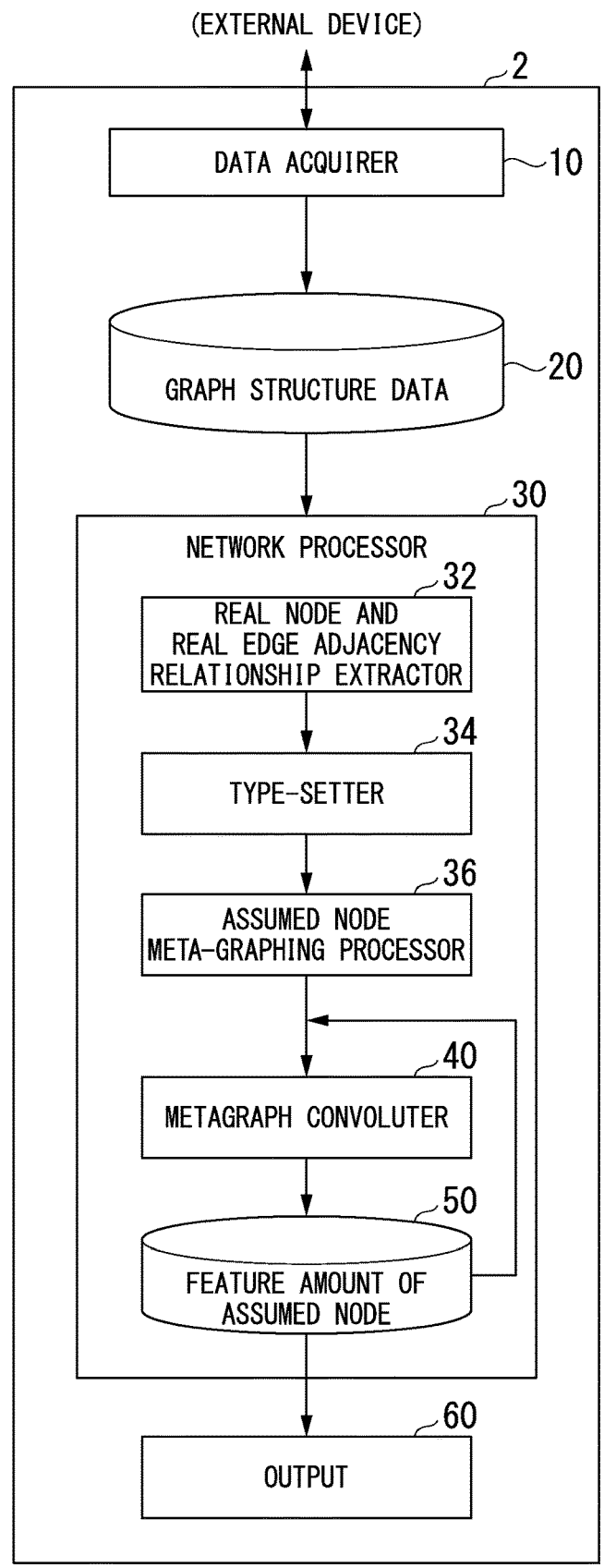
FIG. 8 is a block diagram of an information processing device according to the second embodiment.

FIG. 8 is a block diagram of an information processing device 2 according to the second embodiment. The information processing device 2 further includes, for example, a type-setter 34 as compared to the first embodiment. The type-setter 34 is realized by, for example, a hardware processor such as a CPU executing a program (software). Some or all of these components may be realized by hardware (including circuitry) such as an LSI, an ASIC, an FGA, or a GPU, or may also be realized by software and hardware in cooperation. The program may be stored in a storage device such as a hard disk drive (HDD) or a flash memory, or may be stored in a detachable storage medium such as a DVD or a CD-ROM and installed by the storage medium being mounted in a drive device.

The type-setter 34 refers to a result extracted by the real node and real edge adjacency relationship extractor 32 and gives a type as described above to each of the real node RN and the real edge RE.

The assumed node meta-graphing processor 36 determines the coefficient $\alpha_{i,j}$ by applying a propagation matrix W in accordance with a type of a propagation source of the feature amount using a rule based on the graph attention network described above.

Functions of other components are the same as those in the first embodiment.

According to the second embodiment, it is possible to cope with a wider range of needs.

The configuration described above is suitable for analyzing a state of a social infrastructure. For example, an analysis target such as a power transmission and distribution network or a water and sewer network can be accurately analyzed by ascertaining it as a graph structure.

Figure 9:
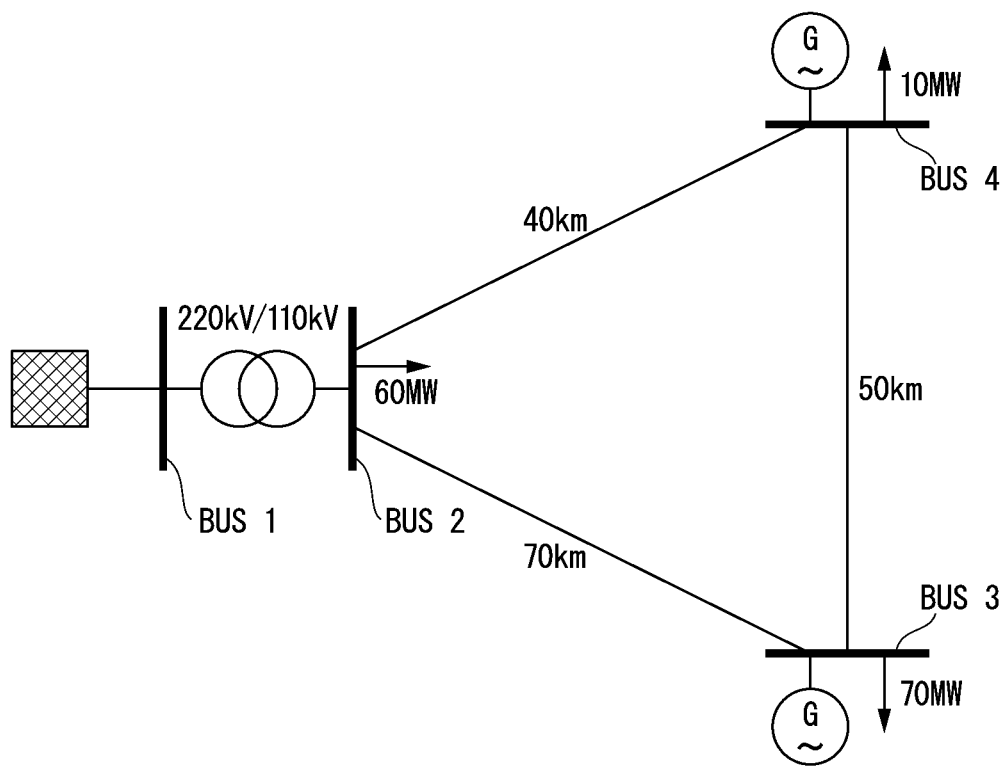
FIG. 9 is a diagram for describing how the second embodiment is applied to a power transmission and distribution network.

FIG. 9 is a diagram for describing how the second embodiment is applied to the power transmission and distribution network. The shown configuration includes buses 1 to 4. A bus is a concept such as a "place" where a power supply source and consumers are connected. A transformer is provided between the bus 1 and the bus 2. A consumer of 60 [MW] is connected to the bus 2. The bus 2 and the bus 3 are connected by a power line of 70 [km]. A generator and a consumer of 70 [MW] are connected to the bus 3. The bus 2 and the bus 4 are connected by a power line of 40 [kin], and the bus 3 and the bus 4 are connected by a power line of 50 [km]. A generator and a consumer of 10 [MW] are connected to the bus 4. In such a configuration, if the buses are considered to be real nodes, the transformer is considered to be a real edge of a type "T," and the power line is considered to be a real edge of a type "L," it is possible to analyze a state in the neural network and the graph structure data shown in FIG. 7. In this case, input attributes input to the assumed node AN based on the real node RN include a type, a connected load, a shunt resistance, and the like. There is a circuit constant as the input attributes input to the assumed node AN based on the real edge RE of the type "T," and there is a distance, a unit degree of freedom, and the like as the input attributes input to the assumed node AN based on the real edge RE of the type "L." The input attributes are static information of the feature amount.

It is desirable to meet the following requirements when analysis processing using a neural network is performed on a social infrastructure resembling a graph structure.

1. Large Scale

A size of scale and expandability are basically required for application to a social infrastructure. For example, if the power transmission and distribution network is considered, a large-scale circuit network with more than 10,000 buses (connection points of facility apparatuses, demand loads, and the like) may be made.

2. Diversity

Most input information for which a conventional neural network is adopted has been uniform attribute signals. For example, in the case of image processing, an input has been one type of information referred to as a pixel signal or its characteristic signal. However, in the case of a social infrastructure, the number of input signals (dimensions) may be thousands or more, and a network layer may have a large scale such as several tens of layers. if the power transmission and distribution network described above is considered, it is a large-scale system in which various facilities such as generators, transformers, loads, transformers, and electric wires are connected.

3. Variability

Normally, the social infrastructure itself has a long operation period during which maintenance, improvement, and replacement of an apparatus are repeated, and a review of operation management or an investment examination is performed each time. In this manner, a function of following partial improvements and changes in social infrastructure without model retraining is required.

On the other hand, the information processing device of the embodiments can suppress an increase in processing load even if an analysis target is large-scale because it is unnecessary to comprehensively search for parameters related to propagation by using the propagation matrix W in common among a plurality of assumed nodes AN. The information processing device can cope with a request for diversity by setting types for the assumed nodes AN and making the propagation matrix W different depending on the types. Since the number of connections in the neural network is limited to those that have an adjacency relationship (connection relationship) in data of an original graph structure, the device can cope with even a request for variability.

Modified Example of the First or Second Embodiment

Figure 10:
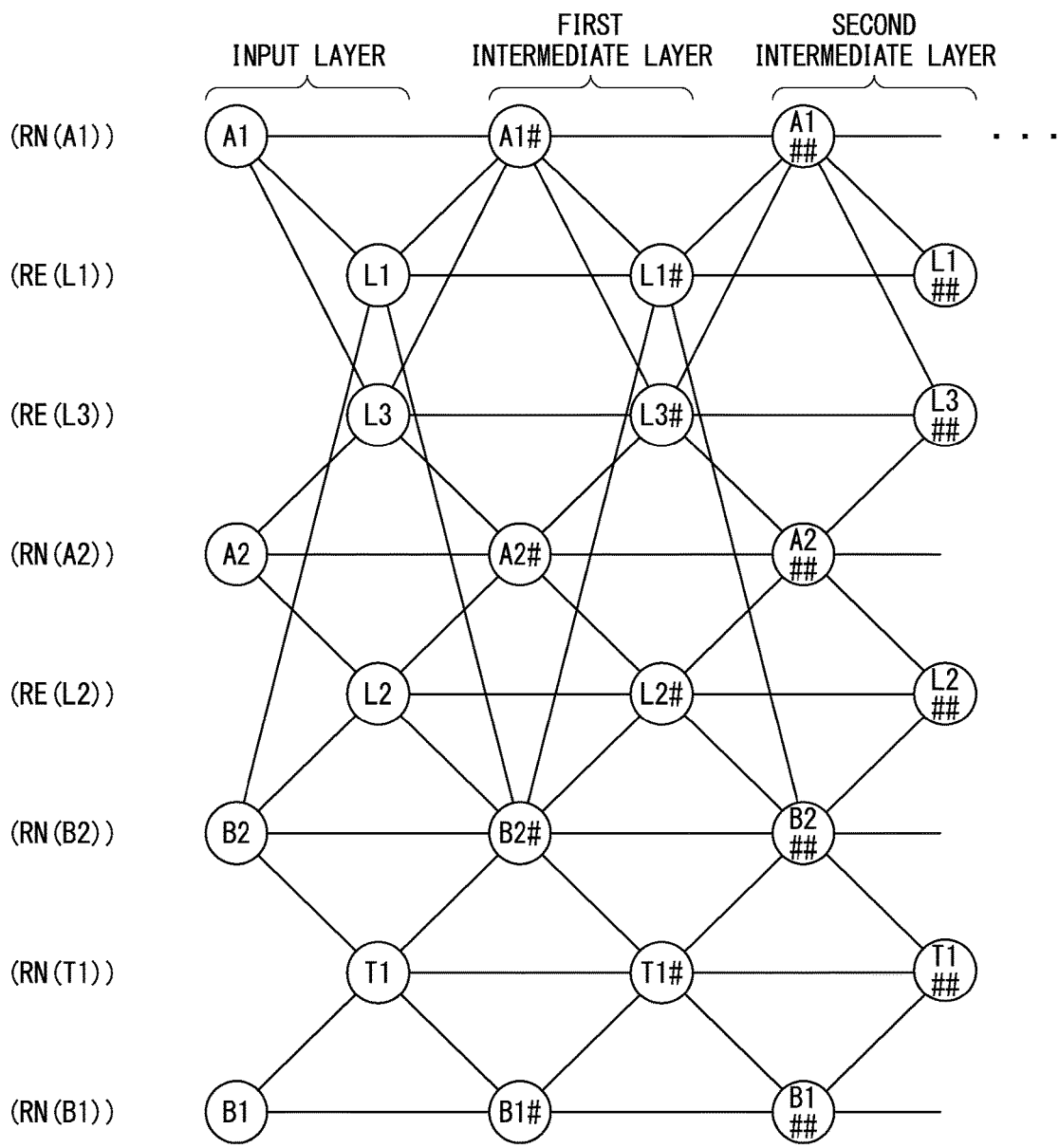
FIG. 10 is a diagram which shows an example of a neural network according to a modified example.

In each of the embodiments described above, a real node RN and a real edge RE are set as an assumed node and subjected to processing without distinction on the neural network, but processing for an assumed node AN based on the real node RN and processing for an assumed node AN based on the real edge RE may be alternately performed while staggering a timing. FIG. 10 is a diagram which shows an example of a neural network according to a modified example. With such a configuration, the state of a corresponding real node RN can be more quickly propagated to another real node adjacent thereto (connected via one real edge). In this case, information may be propagated by a rule different from a rule of the graph attention network in the propagation from a real edge.

According to at least one embodiment described above, it is possible to cope with a wider range of needs by including the data acquirer 10 configured to acquire the graph structure data 20 that includes a plurality of real nodes RN and one or more real edges RE connecting two of the plurality of real nodes RN, and the network processor 30 configured to execute processing of propagating a feature amount of a $k-1^{th}$ layer of each of a plurality of assumed nodes that include the plurality of real nodes RN and the one or more real edges RE at least to a feature amount of a $k^{th}$ layer of another assumed node AN in a connection relationship with each of the assumed nodes AN (k is a natural number equal to or more than 1) in a neural network on the basis of the graph structure data 20 acquired by the data acquirer 10.

Although some embodiments of the present invention have been described, these embodiments are presented as examples and are not intended to limit the scope of the invention. These embodiments can be implemented in various other forms, and various omissions, replacements, and changes can be made without departing from the spirit of the invention. These embodiments and their modifications are included in the invention described in the claims and the equivalents thereof as well as being included in the scope and the gist of the invention.

What is claimed is:

1. An information processing device comprising:
processing circuitry configured to
acquire graph structure data that includes a plurality of real nodes and one or more real edges connecting two of the plurality of real nodes; and
execute processing of setting a neural network that propagates a feature amount of each of a plurality of assumed nodes, the plurality of assumed nodes including the plurality of real nodes and the one or more real edges, that are distinguishable from each other, and propagating a feature amount of a $k-1^{th}$ layer of each of the plurality of assumed nodes at least to a feature amount of a $k^{th}$ layer of another assumed node in a connection relationship with each of the assumed nodes in the neural network on the basis of the acquired graph structure data, k being a natural number equal to or more than 1,
wherein the processing circuitry is configured to set at least part of the coefficient when the feature amount is propagated using a rule based on a graph attention network, and
wherein the processing circuitry is configured to set a propagation matrix to be applied to each of the feature amount of an assumed node of a propagation source and the feature amount of an assumed node of a propagation destination according to the type of the assumed node of a propagation source.

2. The information processing device according to claim 1,
wherein the processing circuitry is configured to propagates the feature amount of the $k-1^{th}$ layer of each of the plurality of assumed nodes to a feature amount of a $k^{th}$ layer of each of the assumed nodes itself.

3. The information processing device according to claim 1,
wherein the processing circuitry is configured to set types of the assumed nodes from a plurality of types, and make a rule for setting a coefficient when the feature amount is propagated different depending on the set types of the assumed nodes.

4. An information processing method comprising:
by a computer,
acquiring graph structure data that includes a plurality of real nodes and one or more real edges connecting two of the plurality of real nodes; and executing processing of setting a neural network that propagates a feature amount of each of a plurality of assumed nodes, the plurality of assumed nodes including the plurality of real nodes and the one or more real edges, that are distinguishable from each other, and propagating a feature amount of a k-1$^{th}$ layer of each of the plurality of assumed nodes at least to a feature amount of a k$^{th}$ layer of another assumed node in a connection relationship with each of the assumed nodes in the neural network on the basis of the acquired graph structure data, k being a natural number equal to or more than 1, wherein the information processing method comprises:

setting at least part of the coefficient when the feature amount is propagated using a rule based on a graph attention network; and setting a propagation matrix to be applied to each of the feature amount of an assumed node of a propagation source and the feature amount of an assumed node of a propagation destination according to the type of the assumed node of a propagation source.

5. A non-transitory computer-readable storage medium storing program causing a computer to perform:

acquiring graph structure data that includes a plurality of real nodes and one or more real edges connecting two of the plurality of real nodes; and executing processing of setting a neural network that propagates a feature amount of each of a plurality of assumed nodes, the plurality of assumed nodes including the plurality of real nodes and the one or more real edges, that are distinguishable from each other, and propagating a feature amount of a k-1$^{th}$ layer of each of the plurality of assumed nodes at least to a feature amount of a k$^{th}$ layer of another assumed node in a connection relationship with each of the assumed nodes in the neural network on the basis of the acquired graph structure data, k being a natural number equal to or more than 1, wherein the program causes the computer to perform:

setting at least part of the coefficient when the feature amount is propagated using a rule based on a graph attention network; and setting a propagation matrix to be applied to each of the feature amount of an assumed node of a propagation source and the feature amount of an assumed node of a propagation destination according to the type of the assumed node of a propagation source.

* * * * *